(12) United States Patent
Johnson

(10) Patent No.: US 8,501,060 B2
(45) Date of Patent: Aug. 6, 2013

(54) METHOD AND APPARATUS FOR CONTROLLING THE TEMPERATURE OF MOLDS, DIES, AND INJECTION BARRELS USING FLUID MEDIA

(75) Inventor: Kenneth E. Johnson, Hollis, NH (US)

(73) Assignee: MoldCool International LLC, Bow, NH (US)

( * ) Notice: Subject to any disclaimer, the term of this patent is extended or adjusted under 35 U.S.C. 154(b) by 1092 days.

(21) Appl. No.: 12/278,579

(22) PCT Filed: Feb. 13, 2007

(86) PCT No.: PCT/US2007/062023
§ 371 (c)(1),
(2), (4) Date: Aug. 7, 2008

(87) PCT Pub. No.: WO2007/095515
PCT Pub. Date: Aug. 23, 2007

(65) Prior Publication Data
US 2009/0174101 A1    Jul. 9, 2009

Related U.S. Application Data

(63) Continuation of application No. 11/352,894, filed on Feb. 13, 2006, now Pat. No. 8,114,321.

(51) Int. Cl.
*B29C 47/92*    (2006.01)
(52) U.S. Cl.
USPC ............... 264/40.6; 264/328.14; 264/328.16; 264/519; 165/263; 236/46 F; 236/78 D; 62/185; 62/201; 700/202; 261/DIG. 75
(58) Field of Classification Search
USPC ............... 62/185, 201, 310, 306, 307, 171, 62/304, 502, 335, 79, 175; 236/46 F, 78 D; 165/263, 293; 700/202; 264/40.6, 519, 328.16, 264/328.14; 374/29–33, 39–40, 100, 141, 374/135, 137, 143, 165; 261/DIG. 75
See application file for complete search history.

(56) References Cited

U.S. PATENT DOCUMENTS 2,937,506 A * 5/1960 Stirlen .................. 62/121
3,905,312 A    9/1975 Nichols
(Continued)

FOREIGN PATENT DOCUMENTS

GB    2 113 315 A    8/1983
GB    2 156 445 A    10/1985
(Continued)

OTHER PUBLICATIONS

PCT Search Report dated Nov. 20, 2007 of Patent Application No. PCT/US07/62023 filed Feb. 13, 2007.

(Continued)

*Primary Examiner* — Frantz Jules
*Assistant Examiner* — Azim Abdur Rahim
(74) *Attorney, Agent, or Firm* — Maine Cernota & Rardin

(57) ABSTRACT

For controlling temperature in the molding of plastics, metal, ceramic, or die-casting, a circulator supporting a molding machine includes a fixed displacement pump driven by an electronic servo motor for volumetric metering of thermal fluid to or from the molding machine. A pre-set or dynamically controlled volume and flow rate profile matches the heating and cooling requirement of a molding machine and process. Volumetric metering may be based on parameters such as time, machine cycle status, temperature, pressure, and/or flow rate. Fluid may be circulated through the mold at positive or negative pressure at fixed, variable, or pulsed flow. The supply side in a fluid loop may be restricted so as to cause a pressure drop in or upstream of the mold, die or barrel, and seed bubbles may be injected into the fluid flow to excite vaporization and lowering of the fluid temperature.

20 Claims, 6 Drawing Sheets

U.S. PATENT DOCUMENTS

| | | | |
|---|---|---|---|
| 3,913,398 A * | 10/1975 | Curtis | 73/152.33 |
| 4,278,230 A | 7/1981 | Allen | |
| 4,318,874 A * | 3/1982 | Lemelson | 264/40.1 |
| 4,354,812 A | 10/1982 | Wieder et al. | |
| 4,367,785 A | 1/1983 | Allen | |
| 4,420,446 A | 12/1983 | Wieder et al. | |
| 4,680,001 A | 7/1987 | Waters | |
| 4,768,484 A | 9/1988 | Scarselletta | |
| 4,902,454 A | 2/1990 | Steinbichler et al. | |
| 4,936,312 A | 6/1990 | Tsukagoshi | |
| 5,026,171 A | 6/1991 | Feller | |
| 5,047,605 A | 9/1991 | Ogden | |
| 5,376,317 A | 12/1994 | Maus et al. | |
| 5,427,720 A | 6/1995 | Kotzab | |
| 5,452,999 A | 9/1995 | Evans | |
| 5,507,150 A * | 4/1996 | Weber et al. | 62/100 |
| 5,589,114 A | 12/1996 | Evans | |
| 5,620,715 A | 4/1997 | Hart et al. | |
| 5,720,912 A | 2/1998 | Liehr et al. | |
| 5,772,933 A | 6/1998 | Kotzab | |
| 6,312,628 B1 | 11/2001 | Wieder et al. | |
| 6,312,638 B1 * | 11/2001 | Ward et al. | 264/322 |
| 6,368,737 B1 * | 4/2002 | Margiott et al. | 429/437 |
| 6,522,994 B1 | 2/2003 | Lang | |
| 6,609,038 B1 | 8/2003 | Croswell et al. | |
| 7,000,691 B1 * | 2/2006 | Weber | 165/281 |
| 7,001,546 B2 * | 2/2006 | Dunk | 264/40.6 |
| 7,856,843 B2 * | 12/2010 | Enis et al. | 62/401 |
| 2003/0145619 A1 * | 8/2003 | Word | 62/310 |
| 2004/0264125 A1 | 12/2004 | Cheng et al. | |

FOREIGN PATENT DOCUMENTS

| | | | |
|---|---|---|---|
| JP | 58064486 A * | 4/1983 | |
| JP | 58120162 | 7/1983 | |

OTHER PUBLICATIONS

Reploglas Corporation, 90smart Temperature contol unit for watrer up to 195 degF, Brochure, 2 pages, St. Joseph, MI.

Mokon, Duratherm Circulating Water Temperature Control System, Brochure, 2 pages, Buffalo, NY.

AEC, TrueTemp Series (TDV1NX) Water Temperature Control Units, Technical Specifications, 4 pages, Wood Dale, IL.

Single, Alternating Temperature Technology ATT series, Brochure, 4 pages, Hochdorf, Germany.

Frigel, Microgel and Turbogel High Performance Cooling for Your Process, Brochure, 6 pages, Scandicci, Italy.

Thermal Care, Temperature Controllers, Brochure, 12 pages, Niles, IL.

Wittmann Kunststoffgerate GmbH, TEMPRO Mold Temperature Controllers, Brochure, 8 pages, Vienna, Austria.

The Conair Group, Inc., Thermolator TW Water Temperature Control Unit, User Guide, 78 pages, Pittsburgh, PA.

AEC, Trutemp TCU Series Water TCUS Heat and Cool, Brochure, 6 pages.

Cenegel, Thermodynamics, 1998, The McGraw Hill Company Inc., Third Edition, see p. 196.

Ritemp Technologies, faster, smarter, eco-friendly cooling, http://www.ritemptechnologies.com/index.php?option=com_content&view=article&id=3&Itemid=4, 2011, 1 page.

* cited by examiner

METHOD AND APPARATUS FOR CONTROLLING THE TEMPERATURE OF MOLDS, DIES, AND INJECTION BARRELS USING FLUID MEDIA

This application is a National Phase Application filed under 35 USC §371 of PCT Application No. PCT/US2007/062023, filed 13 Feb. 2007, which is a continuation of U.S. application Ser. No. 11/352,894, filed 13 Feb. 2006. Each of these applications are herein incorporated by reference in their entirety for all purposes.

FIELD OF THE INVENTION

The invention relates to thermal control systems and methods for exerting thermal control with a thermal fluid circuit, and more particularly, to thermal control systems and methods for use with a mold, die or injection barrel.

BACKGROUND OF THE INVENTION

A thermal fluid circulator in the context of the invention is a device or system that is commonly used in the plastics, metals, ceramics, and die cast molding industries in the control of operating temperatures of molds, dies or injection barrels. Circulator systems may incorporate a built-in chiller. Central chilling systems need a main circulator pumping system. Alternatively, they are also built using water tower evaporative cooling technology. Circulators are also used in other industries besides plastics for similar temperature control purposes. Sometimes circulators are used for controlling the operating temperatures in a two component mixing process such as molding liquid silicone rubber or LSR and sometimes called LIM, which is exothermic process where heat is given off when the polymer chains are cross linking. This type of process requires precise temperature control of a specially designed injection barrel which keeps the two part mixture from chemically setting up prematurely.

The circulator is spoken about in the trades by different names. It is sometimes called a temperature control unit or "TCU". It is called a "Thermolator" in some areas. It may also be called a "water circulator." Some circulator units use oil as the thermal fluid medium and are called "oil circulators or TCU's." Oil circulators are primarily used to heat, not cool the mold, die or barrel. Water circulators can circulate water over a wide range of temperatures depending on system pressure. Under higher than ambient pressures, water-based systems typically are used for heating up to 300° F. and can be configured to go up as high as to 500° F., and are commonly used where heat is desired instead of cooling for the molding of thermoset plastics or just high temperature plastics.

Circulators come in two basic schemes. One type of system is called "direct injection" and the other is called "closed loop." "Direct injection" and "closed loop" describe how the fluid that is directed from the fluid pump to the mold, die or barrel, is returned to the main circulation system after absorbing or shedding thermal energy from the molding process. Circulators can be configured to be both styles and convertible from one or the other in the field.

The amount of energy absorbed or shed by the thermal fluid depends on several variables including the mold details, the process details, and the thermal fluid temperature control (circulator) system details. With regard to the mold, for example, variables may include the thermal conductivity of the material of which the mold, die or barrel is fabricated, the volume (mass) of the mold, the amount and temperature of the material being molded, the amount of surface area exposed to localized and/or total ambient air temperatures and to other incidental or purposeful environmental heating and cooling influences affecting the mold. With regard to the process, variables include its location and concentration within the mold, range of variation or curve of thermal demand or excess over a cycle of operation, duration of the thermal cycle, and dwell time between cycles. With respect to the temperature control (circulator) system, relevant variables include the proximity of the process within the mold to the network of thermal fluid channels, the absolute and average temperature differential of the fluid and the process; the absolute and average rate of BTU transfer required to sustain a repetitive or continuous process, the thermal conductivity and capacity of the thermal fluid, the volume and surface area of the fluid channels within the mold, and the time of exposure and flow rate of the fluid within the mold. The temperature control (circulator) system must have the capacity to sense the thermal requirement, and to supply and control a sufficient quantity of thermal transfer fluid at the right temperature and rate to satisfy the requirement.

Using an example of a water type circulator being used to control the temperature of a plastics injection mold; the direct injection technique directly adds cooled water and extracts heated water to and from the "loop of water" circulating between the pump and the mold in order to control the loop of water temperature and thus in turn the temperature of the mold. In this example, mold or process temperature is controlled, at least in part, by measuring and comparing the temperature of the water returning from the mold against a set point to obtain the temperature rise. The addition of cool water is used to maintain the control loop temperature to a desired set point.

In an alternative technique called "closed loop," the "loop of water" or fluid circulation path passes through a water to water heat exchanger to remove the excess heat picked up from the molding process. Coolant is cycled on and off to the heat exchanger to control the control loop temperature.

Regardless of which scheme is used, the primary method for generating the fluid flow in the current technology conventional circulator is to use a standard, fixed speed electric motor mated to a centrifugal pump. However, with a conventional centrifugal pump circulator there is no means of controlling the pump pressure during molding operations. The temperature control of the loop water or fluid is the only control mechanism available for dynamic control of the mold temperature. While this form of process temperature control is simple and adequate for many purposes, it lacks consideration and control of other variables affecting the cooling dynamic. Voltage variations and slippage in the centrifugal pump affect the rate and volumetric throughput of thermal fluid in the mold, and ultimately reduce the precision of process temperature control.

Additionally, fluctuations in the supply voltage to the motor will likely affect motor speed and system pressure, altering the balance of variables in the cooling dynamics. These pressure fluctuations affect the rate of flow and the precision of process control. This results in a less than optimal design for a circulator system, and does not yield efficient and precise control of the mold temperature. Neither "direct injection" nor "closed loop" modes of circulators using conventional fixed speed/centrifugal pump systems can offer programmable flow schemes controlling more than fluid temperature.

In the field of plastics molding, die casting, metal molding, and ceramic molding there are temperature controllers that use intermittent or pulsed flow techniques. This method for controlling mold die or barrel temperatures is commonly called pulsed cooling or pulsed tempering in the trades. In pulsed cooling schemes the flow is metered in an intermittent on/off method using valves. The "on" duration is lengthened or shortened to compensate for changes in supply pressure and of mold, die or injection barrel temperature. This requires a temperature sensor in the mold or mold water return line just as it exits the mold frame to sense the temperature fluctuations in the process fluctuations, rather than the water loop sensor described previously. Pulsed flow techniques have been disclosed by others, such as in basic injection molding practice, how a controller advances the mold cooling control technology through the use of turning valves on and off or as it is called in the trades, "pulsed cooling" or "pulse tempering". These control systems accomplish their control though the use of a valve that is opened or closed. The controller has a means of measuring the either mold steel temperature, the overall cycle time, or the exit water temperature with appropriate sensors, to determine how often the valve needs to be pulsed on during the injection cycle to maintain a target temperature set point.

What is needed, therefore, are improved systems and techniques for process temperature control in an injection molding process.

SUMMARY OF THE INVENTION

For controlling temperature in the molding of plastics, metal, ceramic, or die-casting, a circulator supporting a molding machine includes a fixed displacement pump driven by a servo stepping motor for volumetric metering of the fluid to or from the molding machine. A pre-set, manually adjustable or dynamically computer controlled volume and flow rate profile matches the heating and cooling requirement of a molding machine and process. Volumetric metering may be based on selected parameters such as one or a combination of time, machine cycle status, temperature, pressure, and flow rate. Fluid may be circulated through the mold at positive or negative pressure at fixed flow, variable flow, or pulsed flow. The fluid flow may be restricted so as to cause a pressure drop at or upstream of the mold and it may be injected with air or gas seed bubbles to excite phase change vaporization and the lowering of the fluid temperature for increased cooling potential in the mold.

The prior art provides several techniques for restoring the return line temperature or post process temperature to a supply line temperature or temperature that will provide a surplus of heating or cooling capacity to the control loop and hence to the molding machine. However, the effectiveness of these techniques varies considerably based on system design, component selection, and overall operating conditions, all of which limits the precision and reliability of the temperature control process. In one respect, the invention relates to the control the temperature and volume of fluid in the temperature control system, in real time or near real time, shifting the basis of control to the precision delivery of thermal energy to the molding machine in a manner that compensates for the lack of precision in a mainly temperature control system.

In one aspect the invention replaces a conventional constant speed motor/centrifugal pump arrangement with a digital electronic servo motor and a positive displacement pump in a conventional molding temperature controller, commonly called a "circulator". An electronic servo motor does not vary in rotor speed or RPMs (rotations per minute) as the supply line voltage fluctuates as a conventional motor driven pump does because in a servo motor, rotor speed is independent of variations in line voltage. The positive displacement pump meters exact quantities of coolant in proportion to the programmed and controlled speed of the motor. A circulator in accordance with the invention is used to control the temperature of a mold, die or injection barrel by controlling the flow rate of the thermal transfer fluid (cooling or heating fluid) to the mold.

The loop or circular routing of heated or cooled fluid that is plumbed from the circulator pump to the mold, die or injection barrel and back is defined as the "control loop." The terms: coolant, cooling fluid, heating fluid, thermal transfer fluid, temperature control fluid, cooling water, oil, and water are used interchangeably herein to refer to control loop fluid with respect to fluid circulators used for temperature control of molding machines and molding processes; except where the context limits the term to only one of heating or cooling fluid, or expressly describes or clearly relates to something other than the control loop fluid.

It is therefore a goal of the invention to provide a more energy efficient circulator by eliminating the slippage losses encountered in a centrifugal pump. It is well known within centrifugal pump manufacturing companies that centrifugal pumps add heat to the pumped media in the form of viscous heat dissipation caused by churning the liquid when the fluid is spun centrifugally out of the pump. Moreover the pump delivery in a centrifugal pump is not linear and is always spoken of as a curve where the highest volumetric delivery is called the "nominal rating" of the centrifugal pump. In a positive displacement pump there is no slippage as with a centrifugal pump because these pumps use positive displacement gears, rotors or pistons to move the flow. A positive displacement pumps' volumetric delivery curve is flat or linear. The slippage in a centrifugal pump requires a larger pump and motor to be used to get the same volumetric throughput. For example, in one closed loop circulator something on the order of a seven horsepower motor is required to achieve a delivery pressure of 50 psi. A circulator in accordance with the invention can use a smaller, more efficient servo motor and positive displacement pump to achieve the same 50 psi pressure with the same resultant volumetric throughput. In molds where the cooling channels are seen to be small and restricted the flow rate will be substantially reduced. The large seven horsepower motor and pump will be generating little actual flow and there will be substantial heating of the cooling fluid by the centrifugal pump itself.

Further, the additional heat imparted to the cooling media by a centrifugal pump has to be removed by a central chilling system, adding a further waste, cost or inefficiency to conventional systems. It is a goal of the invention to reduce or eliminate this source of inefficiency and to consume less power to achieve the required flow rate.

In one aspect, a circulator of the invention can be set up to operate at low energy consumption, metering coolant using the central chiller pumping system for energy force. The servo motor and fixed displacement pump perform merely to regulate the flow. This type of pump does not churn the coolant and thereby generate heat which must be removed. Because a circulator in accordance with the invention is not imparting excess work-heat to the fluid, the central chilling system can be smaller and more energy efficient.

A circulator according to some aspects of the invention allows for programming behavior that is not possible with a conventional, constant speed motor/centrifugal pump arrangement. When an electronic, servo motor driven, positive-displacement pump is controlling the fluid flow based on rotational position, desirable profiles of flow or flow rate versus time can be generated and dynamically adjusted or controlled in real time based on sensor data to control the mold, die or injection barrel thermal condition. In conventional circulators, supply and return line pressure variations and voltage supply line variations are not compensated for and these fluctuations can cause change in volumetric throughput. The result is that even if the coolant loop temperature is held precisely constant at the sensor location, the rate of cooling flow or BTU's/second delivered in the mold may be much different. According to one embodiment of the invention, the circulator by means of its electronic, servo motor driven, positive-displacement pump is able to precisely meter this energy rate of coolant to the mold, die or injection barrel, thereby providing an improved method of temperature control for molding processes.

Circulators of the invention may use conventional direct injection or heat exchanger (closed loop) or other techniques to add or remove heat from the control loop of fluid being directed to the mold. In one aspect, a small quantity of cooled fluid may be added to the control loop during every operating cycle of the injection molding machine. Same cycle direct injection puts into the system a quantity of heat energy at the correct temperature for every cycle of the molding machine; the quantity being selected to match the heat output or thermal load that needs to be removed each cycle from the molding process. For example, it may do this by receiving a simple triggered signal from the molding machine indicating the start each cycle, and inserting a predetermined volume calculated to remove the correct amount of heat. The quantities of fluid injected can vary from minimal to continuous, on a per cycle basis.

The return line temperature can also be monitored for temperature rise (or drop) and a prescribed quantity for compensation can be selected or calculated to maintain control loop temperature in processes that vary in timing or in thermal output. In the direct injection method, when a valve opens to allow a quantity of cooler (or warmer) fluid into the loop, the loop is subjected to upstream delivery pressure variations and downstream return line pressure fluctuations. In this moment, using a prior art circulator, the control loop is subject to all the variations upstream and downstream that a conventional centrifugal pump system causes, due to the slippage in the centrifugal pump. Circulators in accordance with the invention having positive displacement pumps and servo controlled speed, may place the necessary braking or boosting of fluid flow needed to assure a constant loop of coolant flow.

With a conventional centrifugal pump/motor circulator the technique used to control the mold, die, or injection barrel is to deliver a temperature controlled flow of fluid and the control means is the setting of this target fluid media temperature. In another means of conventional control using pulsed tempering with a solenoid valve, the mold, die, or injection barrel is controlled in an on-off means where the number and length of the on-off, valve switching pulses determine the rate of cooling control. In distinction, circulators in accordance with some aspects of the invention, using an electronic, servo controlled, positive displacement pump and appropriate sensors and controls, provide the ability to control the mold, die, or injection barrel temperature with a much more precisely calibrated delivery of thermal transfer fluid, the profile of fluid flow volume or rate versus time being adjustable to match the real time or actual thermal profile of the process; cycle by cycle.

In other words, in accordance with some aspects of the invention, a fluid flow rate curve can be programmed and controlled to deliver heated or cooled fluid media in a volumetric flow/time or energy rate curve or profile that is matched to the molding systems' thermal response to the process, and is essentially independent of other variables in the supply and return line flows. For example, a circulator of the invention can be operated in such a way as to deliver boosted or retarded on-off (pump generated) pulses in ways which conventional solenoid valves cannot. There may be generated a flat volumetric curve in either a flow boosted or flow retarded means.

In another aspect of the invention, the controlled flow rate and temperature of the supplied fluid media can be used to calculate and meter a desired quantity of BTUs (British Thermal Units) or heat energy quantity per unit time delivered to the mold, die or injection barrel on a continuous or per cycle or other basis. The quantity and delivery profile can be precalculated for startup, and be further adjusted in real time using appropriate sensors on the machine and/or in the control loop.

With the ability to tailor a flow delivery profile, the curve can be adjusted, for example, to be delivered with a high or low peak at any point in the molding cycle. Using a sensor in the mold wall, die wall or injection barrel wall, a time/temperature curve can be generated that will reflect the mold cavity temperature each cycle of the molding machine. This time/temperature curve is then converted into a heat energy/time delivery curve or thermal profile tailored to the cooling or heating requirements of the process. The delivery of the thermal profile can be advanced in time ahead of the peak measured temperature or general measured temperature profile to account for the time lag or hysteresis effects required to accomplish the higher thermal transfer between the machine mass and the fluid for optimal control in the mold, die or barrel.

In another aspect of the invention, computer programs and algorithms are readily available that can be used to monitor the control inputs, fluid delivery profiles and measured machine responses in order to "learn" the unique thermal profile of a given machine and process and the most effective control loop fluid delivery profile. Comprehensive review of such data will facilitate machine design analysis, identify problem areas, and suggest alternations and improved designs.

In a further aspect, a method of the invention of delivering a specific, pre-calculated BTU quantity per cycle to the molding system in a programmed rate curve or thermal profile allows the circulator to deliver specific BTU quantities per cycle to the molding system without the use of temperature sensors at the mold, die or barrel of the machine, if desired. Neither the conventional pulsed tempering nor the conventional fixed speed centrifugal pump circulator methods can be used in this manner.

In yet another aspect of the invention, a positive displacement pump controlled by a servo motor can be used to precisely control the pressure of the cooling water or other coolant fluid in the cooling lines of a molding machine, through a restrictor that acts somewhat like the expansion valve in a refrigerator cooling circuit, to bring it down to below its liquid/vapor pressure point for the present temperature. When seed bubbles of air or other gas are introduced into the water while it is in this lowered pressure state, such as by injection or otherwise, this will induce a vaporization process by which heat is absorbed from the immediate surroundings. This process will convert some or all of the liquid water to water vapor until the pressure-temperature equation is satisfied by cooling of the water.

Since the cooling of a mold or die with cooling lines and fluid is a dynamic process with the coolant flowing continuously between the circulator and the mold, the point in the cooling circuit at which the phase change is induced is the point where the latent heat absorption can begin, thereby absorbing the equivalent of the heat of vaporization from the mold of die from that point forward in the flow path for as far as the low pressure zone extends, up to the pump. In another aspect of the invention, this dynamic pressure/temperature balance point for controlling the boiling of water at temperatures in typical room temperature ranges uses the precision of a servo controlled circulator running in a negative pressure mode to control this dynamic process inside the mold.

Water in a closed loop cooling system may initially have some air dissolved in it. This air can form the seed bubbles required for vaporization or low pressure "boiling" initially, until it is depleted. However, a better way to operate a continuous, controlled dynamic phase change operation is to continuously introduce or inject seed bubbles of air or gas into the flow of cooling water in or just prior to it entering into the area in the mold cooling circuit where cooling of the mold cavity or core is actually required, and then remove all entrapped air in the high pressure section of the cooling loop downstream of the mold, typically but not necessarily in the circulator.

The water in a negative pressure circulator system undergoes constantly changing pressure as it travels from the coolant source or outlet and through a restriction or flow limiter that acts as a pressure drop or pressure junction point. The restrictor may be variable and controllable by the computer control system to provide pre-set or dynamic flow control and/or supplemental pressure control in the low pressure portion of the cooling circuit; through the supply or distribution line, into the mold, and back through the return distribution line to the pump return inlet. The segment in the cooling loop between the pump outlet and the restriction element is where a higher pressure is restored, and water temperature is typically controlled or conditioned with conventional circulator means.

After the water is conditioned, typically by a water to water heat exchanger, it is passed through the restriction element where the pressure drops again. As the water pressure is lowered it reaches a point where it can boil even at room temperature (70° F.) By injecting a small controlled flow of air or gas using a pressure controlled or regulated air or gas supply into the low pressure coolant flow as "starter" or "seed" bubbles, the water will begin to boil, producing the desired heat absorption via the latent heat of vaporization process in the area just downstream from the injection point. The air or gas injection may be a simple as an air line connected by means of a suitable nozzle to the supply side of the cooling loop. The air supply may be compressed and regulated or not, but must be sustained at a higher pressure than the coolant pressure at that point in the system, in order to avoid backflow of coolant into the air supply circuit.

This dynamic cooling process can be controlled in accordance with one aspect of the invention by using a "closed loop" circulator design where much of the process heat can be removed from the water, typically via a water to water heat exchanger hooked to a central chiller, although other conventional schemes for recovering the high end process heat from the coolant fluid or water are within the scope of the invention. Air or gas injected continuously into the loop on the supply side and run through the mold in the cooling process of the invention may be extracted at any point between the pump outlet and the restrictor where water is under pressure, by use of commercially available air extractors such as The Spirovent® Air Eliminator produced by Spirotherm, Inc., Glendale Heights, Ill.

As will be readily appreciated by those skilled in the art, suitable temperature, pressure and other types of sensors at the mold and elsewhere in the cooling system can be used in conjunction with a computer and user interface to measure and pre-set, monitor, and/or provide constant, cyclic, or dynamic control of the pump, restrictor, and other controllable elements and settings of the cooling system components and cooling fluid temperature, pressure, and flow rate in order to achieve the desired cooling effect in the mold during molding operations.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

One embodiment of the present invention provides an electronic servo motor operating a positive displacement thermal control fluid pump as part of an injection molding temperature control system, commonly called a "circulator" or circulator system. An electronic servo motor is somewhat tolerant of supply line voltage fluctuations that will vary the speed of a conventional motor. The positive displacement pump meters exact quantities of thermal control fluid or coolant in proportion to controlled revolutions of the stepping motor. This circulator system is used to control the temperature of a mold, die or injection barrel by circulating a fluid medium, at a suitably lower or higher temperature depending on whether the process is exothermic or endothermic, through a network of channels in the mold in the conventional manner, adding or extracting heat from the mold. The loop of pre-heated or pre-cooled fluid that is plumbed from the circulator pump to the mold, die or injection barrel is defined as the "control loop." The return flow of the thermal fluid control loop is then reconditioned to the desired fluid temperature, typically by direct injection or heat exchanger methods as described in the background section.

Figure 1A:
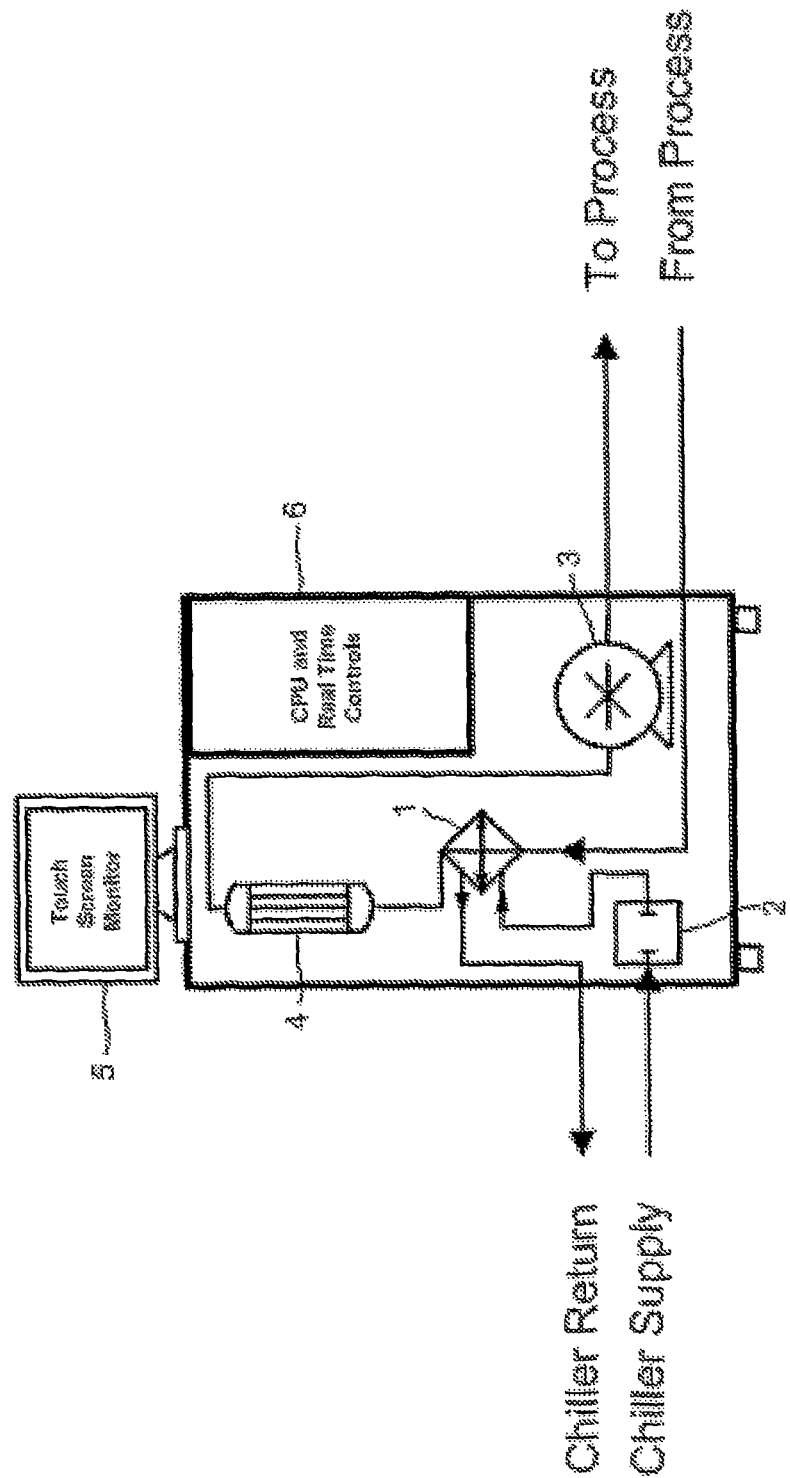
FIG. 1A is a block diagram illustrating a closed loop circulator system configured in accordance with one embodiment of the present invention.
Figure 1B:
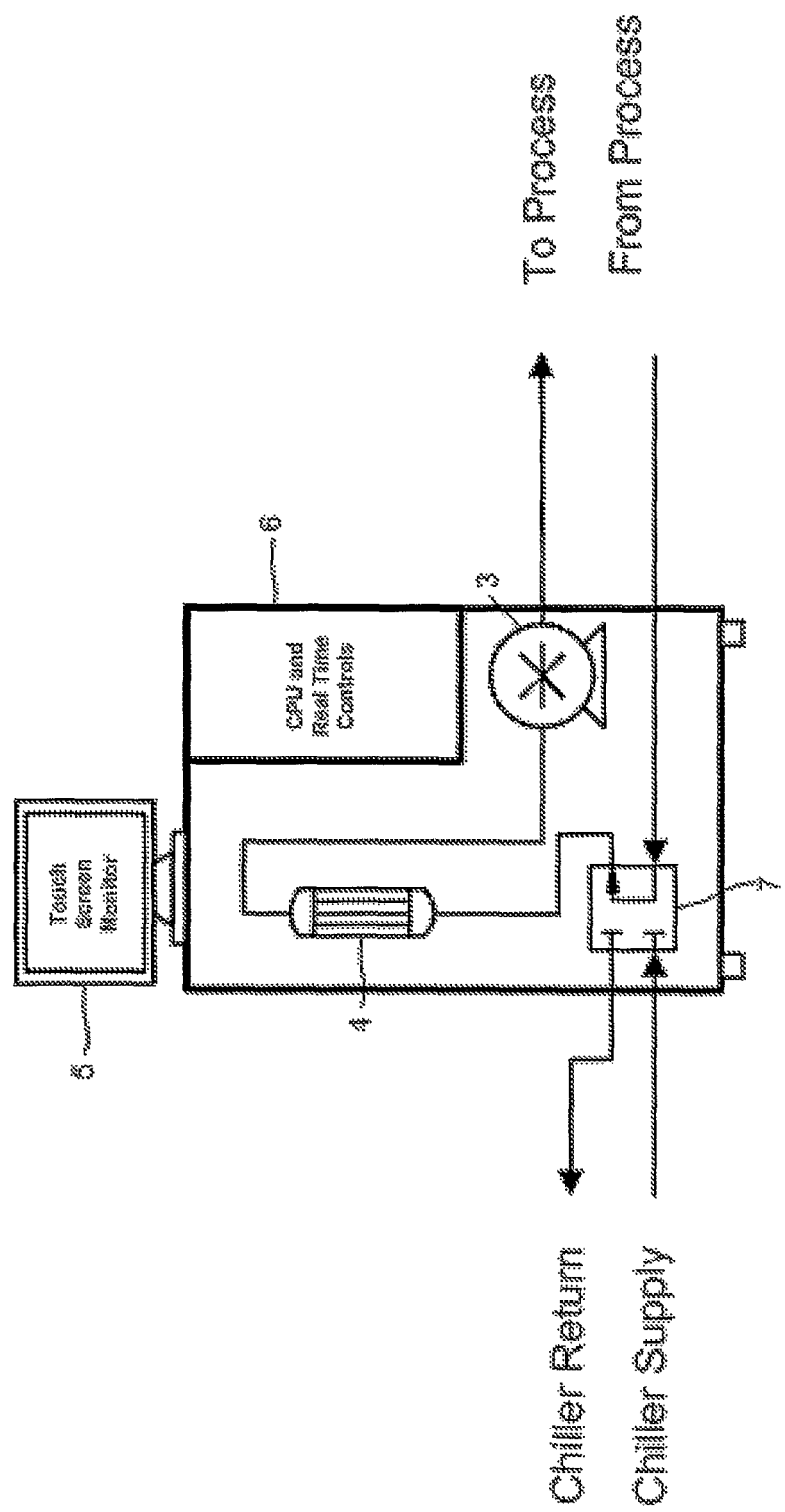
FIG. 1B is a block diagram illustrating a direct injection circulator system configured in accordance with one embodiment of the present invention.

Referring now to FIGS. 1A, 1B, 2 and 3, for convenience all figures use the same reference numbers for the same or analogous components. FIGS. 1A and 1B represent two embodiments of the invention, the two most common circulator techniques, altered in the manner of the invention. FIG. 1A represents a closed loop circulator according to the invention. In this embodiment the cooling/heating fluid medium is circulated via a pump/motor configuration in a closed system where excess heat is removed (or added) using a heat exchanger. FIG. 1B illustrates a direct injection circulator system according to the invention, where make-up fluid at a suitable temperature is injected into the loop while heated fluid is taken out simultaneously.

Figure 2:
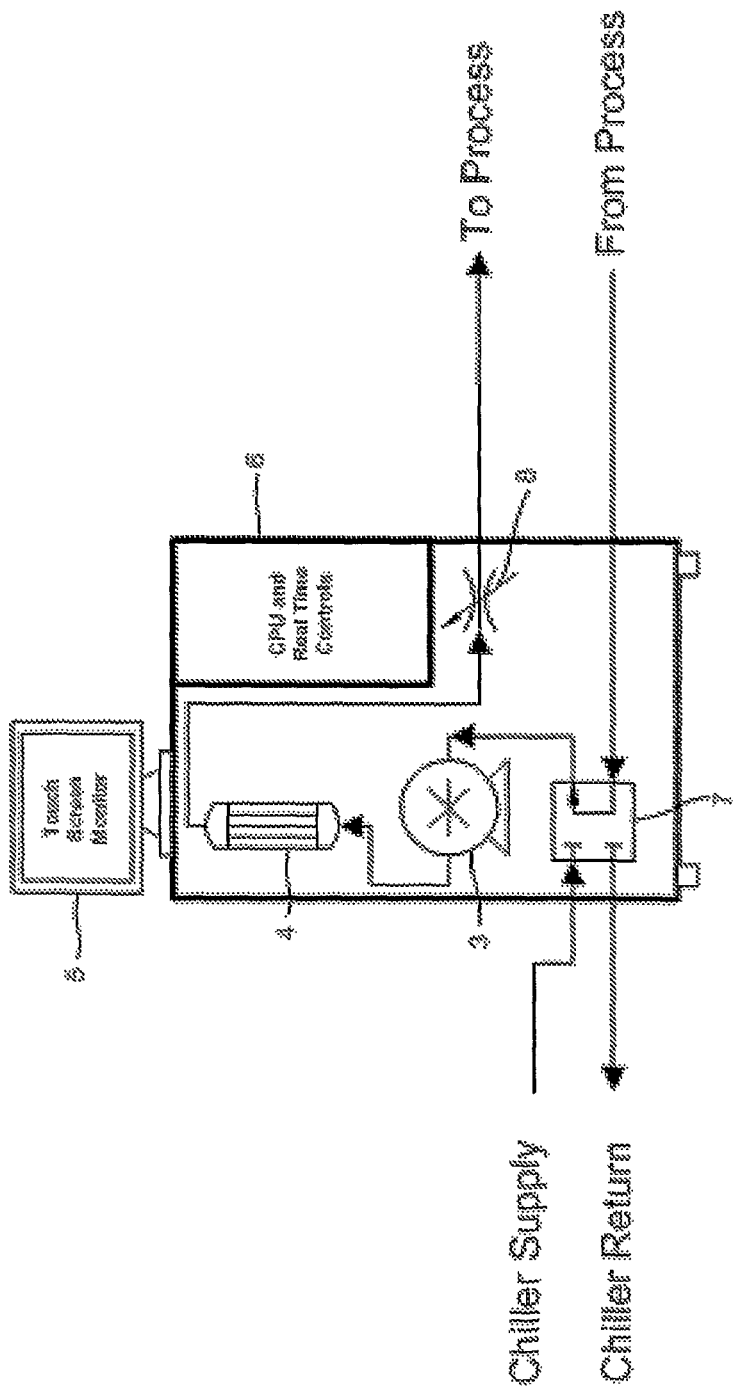
FIG. 2 is a block diagram illustrating a negative pressure direct injection circulator system configured in accordance with one embodiment of the present invention.
Figure 3:
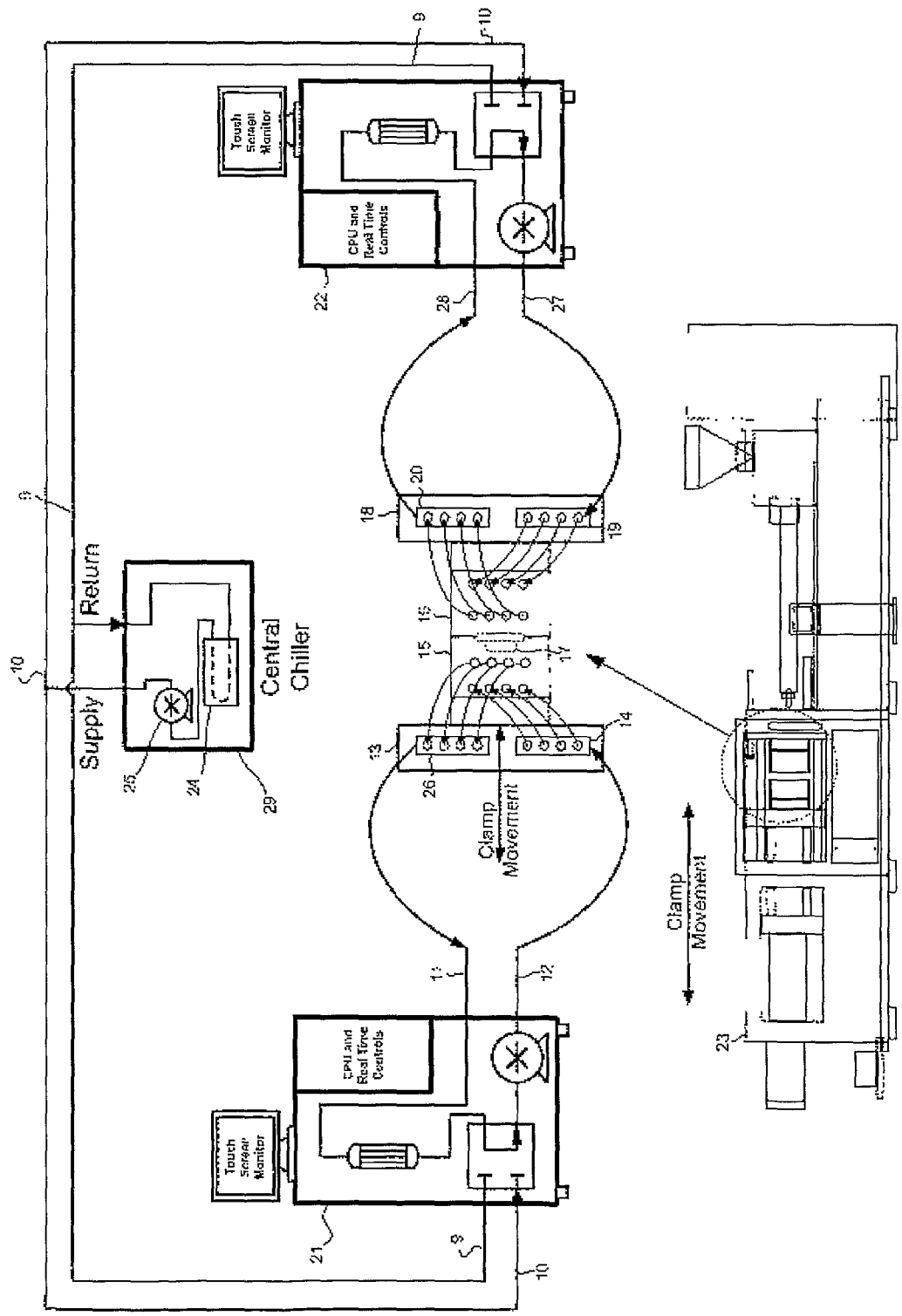
FIG. 3 is a block diagram illustrating a molding system incorporating a circulator system for the control of mold temperature, configured in accordance with one embodiment of the present invention.

FIG. 2 is a representation of a negative pressure circulator embodiment of the invention. FIG. 3 is a drawing showing a typical molding machine and how one embodiment of circulators of the invention are configured with or plumbed into the mold.

Referring again to FIG. 1A, a fluid loop consists of a liquid to liquid heat exchanger 1, connected via an on/off chiller circuit valve 2 to a chiller loop and system configured to meter coolant to the heat exchanger. A servo stepping motor operated, positive displacement pump 3 provides positive flow control to the fluid loop. There is also shown in the fluid loop a fluid heating unit 4, which is common to most circulator system designs. A touch screen human-machine interface 5 (HMI) is connected to CPU and servo control assembly 6 for real time control of pump 3.

Referring now to FIG. 1B, this embodiment is similar to FIG. 1A, including in particular the servo stepping motor operated fixed displacement pump 3 which provides positive flow control to the fluid loop, and the touch screen human-machine interface 5 (HMI) connected to CPU and servo control assembly 6 for real time control of pump 3. However, in this direct injection embodiment, heat exchanger 1 is absent and valve 2 replaced by direct injection valve 7 which is connected to a chiller circuit for thermally reconditioning the make-up supply of fluid.

Referring to FIG. 2, a negative pressure embodiment of the invention is a variation on the embodiment of FIG. 1B except that pump 3 places the mold side of the fluid loop at a negative pressure (with respect to ambient pressure), against the flow resistance offered by inline variable restrictor valve 8.

Referring to FIG. 3, one embodiment of the invention is a molding operation consisting of an injection molding machine 23. Within the machine is a part cavity 17, defined by moving mold half 15 and stationary mold half 16 when they are brought together by moving platen 13 against stationary platen 18. Platens 13 and 18 are configured with supply and return fluid manifolds 14 and 26, and 19 and 20 respectively, for temperature control.

The machine's cooling requirements are serviced by a moving side circulator 21 and a stationary side circulator 22, each of which is configured as the embodiment of FIG. 1B with a servo stepping motor operated fixed displacement pump which provides positive flow control to the fluid loop, and a touch screen human-machine interface (HMI) connected to a CPU and servo control assembly for real time control of the pump. Circulators 21 and 22 are each being serviced for make-up fluid by central chiller 29 via return and supply lines 9 and 10. Central chiller 29 consists of servo'd, fixed displacement pump 24 and refrigeration unit 25.

Figure 4:
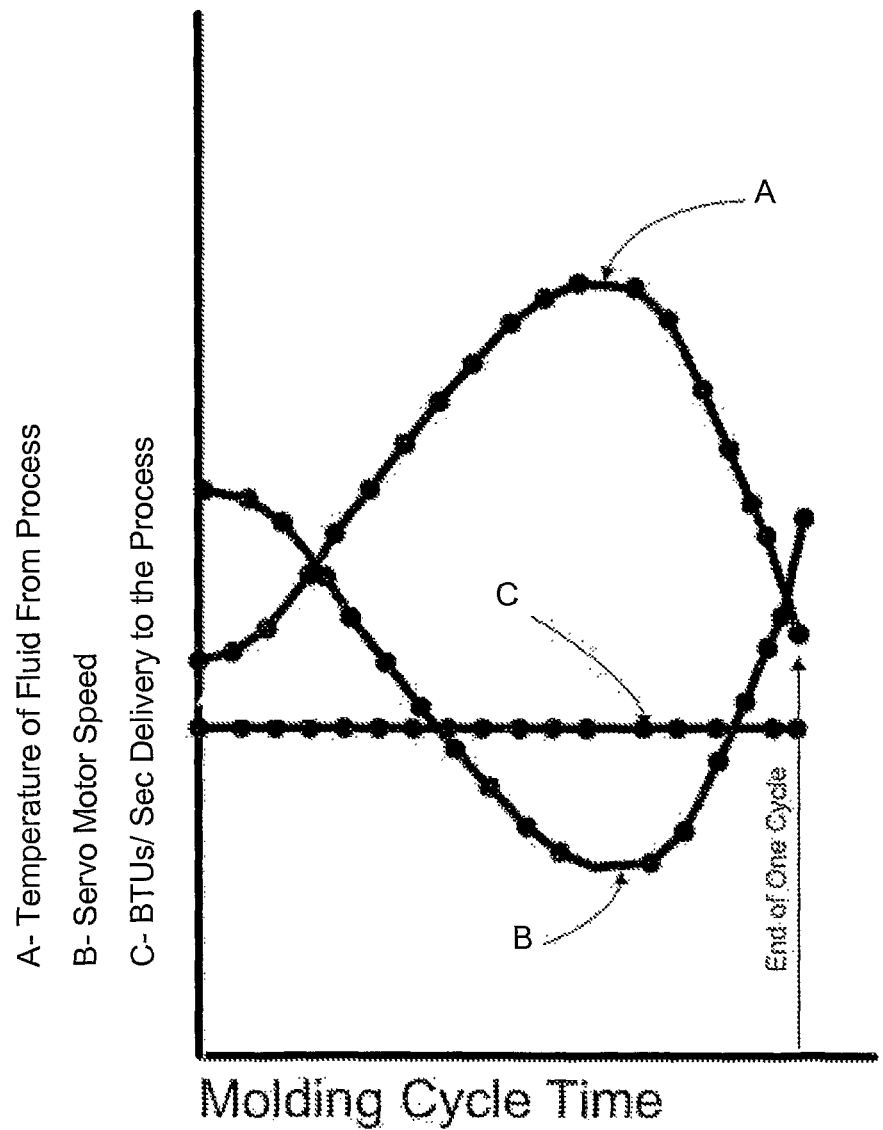
FIG. 4 is an overlay of curves of process temperature, motor speed response, and resulting heat energy being admitted to the control loop during a molding cycle in one embodiment of the invention.

Referring now to FIG. 4, in one embodiment of the invention, the flow rate and temperature of the supplied fluid media can be controlled by a circulator of the invention, to meter the heating fluid injection or heat transfer to the control loop, and fluid flow in the control loop such that a selected heat energy or BTU (British Thermal Unit) level and quantity is delivered at the correct rate over the course of each cycle of operation to the mold, die or injection barrel. For example, in FIG. 4, curve A is the temperature profile of the return line fluid as measured at the circulator, shown here over the period or time of one molding cycle. Temperature curve A characterizes the rate of heat rejection of the mold, die or barrel by the process. The electronic servo motors of the circulators in this embodiment have been programmed in response to curve A with a pump speed profile, curve B, which directly represents the inverse of the control loop thermal flow rate or $(BTU's/Sec)^{-1}$ supplied by the fixed displacement pump of the circulator, as a dynamic control response, to maintain a uniform or constant rate of heat energy transfer between the mold, die or barrel and the fluid. In other words, the rate at which fluid is advanced by the fixed displacement pump and servo motor is directly proportional, on a dynamic basis, to the change in temperature of the return side fluid, reflecting the rate of energy being given off by the process, with the goal of stabilizing the amount heat energy transfer per unit of fluid delivered to the process during each cycle. The sum of the two curves represents the curve or thermal profile of heat energy transfer over time, on a cyclic basis, as is illustrated by curve C, which is preferably a straight line in most instances in order to achieve thermal stability and cooling efficiency.

The curve B fluid delivery profile can be pre-calculated for startup, and be further adjusted in real time using appropriate sensors in either line of the control loop or on the machine itself. With the ability to tailor a flow delivery profile, the curve can be adjusted, for example, to be delivered with a high or low peak at any point in the molding cycle. Using a sensor in the mold wall, die wall or injection barrel wall, a time/temperature curve can be generated that will reflect the mold cavity temperature for a cycle of the molding machine. This time/temperature curve at the wall may then be matched to the heat energy output or BTU/second delivery curve and a programmed curve for motor speed can be derived. This temperature control process can be conducted in a dynamic, ongoing basis, with feedback from one cycle affecting the control loop flow rate for the same or the next cycle and so on. The delivery profile may need and can be advanced in time ahead of the peak return temperature or general machine temperature profile to account, for example, for the time lag or hysteresis of the system, such as for the time required for returning fluid flow to reach the sensor.

In another aspect of the invention, computer programs and algorithms are readily available that can be used to monitor the control inputs, fluid delivery profiles and measured machine responses in order to "learn" the unique thermal profile of a given machine and process, and create the most effective control loop fluid delivery profile, and to periodically or dynamically adjust fluid delivery profiles during molding operations. Collection and review of such data will facilitate machine design analysis, identify problem areas, and suggest alternations and improved mold machine designs.

Figure 5:
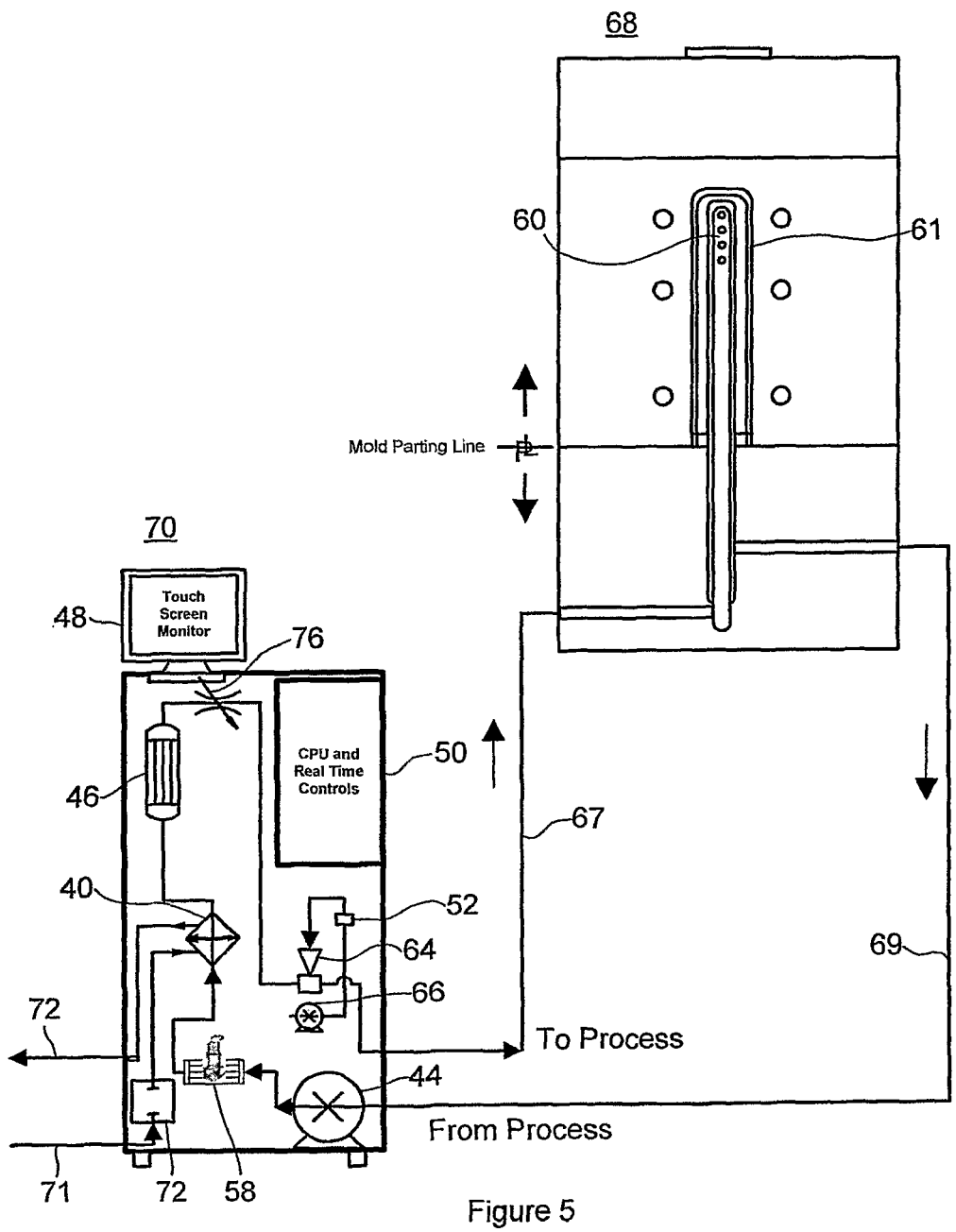
FIG. 5 is a simplified diagram of one embodiment of the invention, illustrating a mold that is being cooled by a negative pressure fluid cooling system that includes a phase change controller circulator incorporating an in-line variable restrictor, gas injector, and a servo-controlled fluid positive displacement pump drawing low pressure coolant through the cooling channels of the mold.

Referring now to FIG. 5, a mold 68 is illustrated as being cooled by coolant delivered from phase change controller circulator 70 through supply line 67 to a bubbler cooling tube 60 inserted into a cavity 61 in the mold and returned by return line 69 to phase change controller circulator 70. Circulator 70 is further connected via chiller supply line 71 and cooling valve 72, and chiller return line 72 to a chiller (not shown).

Components associated with circulator 70 include a servo-controlled fixed displacement pump 44, air eliminator 58, water to water heat exchanger 40, water heating unit 46, variable restrictor 76, and an air injector 64 supplied by air pump 66 via air pressure regulator 52. Suitable sensors, not shown, are connected to a computer control system 50, operable through a user interface 48. If the run of coolant hose of lines 67 and 69 to and from the mold is quite long, circulator 70 or some of these components can be placed at the mold or even incorporated into the mold frame.

In one embodiment, the process controls for this technique are based on temperature of the delivered water, temperature of the returned water, and the rotational speed of the servo fixed displacement pump. Suitable sensors are not shown but will be readily understood by those skilled in the art. Without the volumetric control of the fixed displacement pump, the flow rate of the water through the mold would vary with fluctuations in motor rpm due to voltage fluctuations. This would in turn affect the system pressure, the rate at which the water is converted to vapor, and the precision with which the cooling can otherwise be provided in the systems described.

In one embodiment of the invention, a typical startup scenario provides that the pump control be set to flow water through the water loop at a low rate such that water passing through the restrictor does not create a high differential pressure across the restrictor. This allows a mold with a hot runner system to be cooled during the starting heat up phase of the hotrunner and melt probes. Once the hotrunner is up to temperature the initiation of phase change cooling can begin. The rotational speed of the servo pump is increased to create a flow rate that the restrictor cannot pass without causing pressure build up on the upstream side and pressure drop on the downstream side. The phase change mode is initiated when water pressure in the downstream flow from the restrictor is said to be "negative" or at less than one atmosphere.

Conventional pressure sensors in the delivery and return lines monitor the line pressures to set control limits during system set up. Once this pump speed is set and the desired pressure differential across the restrictor is reached, the air injection can begin. The pressure differential across the restrictor is continued to be monitored at this point. The air injection creates the needed seed sites for the initiation of vaporization in the negative pressure water flow. An air injection nozzle or point of injection can be any variety of geometries such as a needle, cross drilled tubing, air knife, multi-port "shower head", and so forth, depending on the size of the cooling lines and range of flow rate of the coolant. The fluid supply line can be considered to include the hose or conduit leading to the mold and any portion of fluid channels in the mold preceding the point where cooling is required. The restrictor and/or the air or gas injector or injectors can be disposed at the most favorable place down stream of the pump and in the supply line or mold up to the point where cooling is required, as the combination of low pressure and trigger bubbles that is the agent that excites the cooling effect in this embodiment.

What is illustrated in mold 68 of FIG. 5 is the mold cooling geometry for molding hollow parts such as a test tube or pen barrel. A conventional temperature sensor can be placed in the mold cavity or core to monitor the mold steel temperature in order to confirm phase change cooling has commenced, although it is not necessary for controlling the phase change process. Once the phase change process is initiated the mold cavity begins to be "ultra cooled" and mold cavity temperatures can fall below freezing (32° F.) Two additional control parameters in addition to conventional circulator delivery/return temperature and pressure sensors used for maintaining the steady dynamic phase change process that may be required in some embodiments are the "pump rotational speed" and the injected "seed air pressure." The pump rotational speed equates to volumetric flow rate of the coolant. The "seed air pressure" controls balance of seed sites in the coolant stream. Although normal room air may be used, this is comprised of a mixture of gases. Other gases may be used to create the seed sites, although there may be attendant issues of containment and recycling.

A servomotor driven fixed displacement pump according to one embodiment of the invention is mounted in a multiplicity of devices such as a circulator device, a small portable chiller, a central large chilling system feeding multiple machines, mounted in a central large evaporative cooling unit feeding multiple machines, a portable tower evaporative cooling unit, or in some embodiments just driving fluid for the purpose of controlling the rate of fluid flow though the mold, die or injection barrel channels, thereby providing means for more precise control of the process and mold temperature throughout each process cycle and the dwell time between cycles as well.

Dynamic control of speed of the servo motor controls the output of the fixed displacement pump and in turn provides dynamic control of the flow rate of the coolant through the mold, die or injection barrel channels during the process.

The additional cooling or heating required to control the temperature of the mold, die or injection barrel and/or the loop of fluid from the circulator to the mold, die or injection barrel may be handled by either "direction injection" or "closed loop" techniques or such other techniques as are susceptible of improvement in accordance with the invention. In its more basic embodiments there may be no heating or cooling sensing or control provision or requirement, but simply a requirement for precise control or dynamic metering of flow rate, as in the case where an oversupply of cooling capacity and a process only requires a repetitive ebb and flow of fluid at a desired rate/time characteristic or curve.

In one embodiment, a personal computer (PC) running an operating system such as Windows, Linux, Unix, or any other operating system may be used as a human machine interface (HMI) to the real time controls. The HMI is used to display multimedia content for the benefit of help screens.

The HMI is networked and is used to display any kind of documentation using custom or commercially available programs such as Word, Excel, PowerPoint, Video, Audio, or CAD, and associated files stored locally or accessed via a networked server. The HMI may be used to link to remote WANs (Wide Area Networks) for remote monitoring, reporting, control inputs, diagnosis and debugging via the internet. The HMI computer may be used to send process data via protocols such as but not limited to OPC (Object Linking and Embedding for Process Control) to a separate molding system SPC/SQC (Statistical Process Control/Statistical Quality Control) controller. The HMI computer may be used to remotely diagnose and debug the controller over a LAN or WAN. In other embodiments, a pump servo controller may be operated via real time controls and may operate the system independent of an on-line HMI connection.

In one circulator embodiment the stepping motor driven, positive displacement pump operates at a constant or variable speed in an in-line configuration and simply meters the flow to the mold, die, or injection barrel. In another circulator embodiment this pump operates at a constant or variable speed as programmed but with the addition of a control loop return line fluid temperature sensor feeding back temperature data to a real time controller which varies the temperature of loop of temperature control fluid going to and from the mold by adding heat with a conventional in-line heater or removing heat via direct injection or a fluid to fluid heat exchanger.

In another circulator embodiment the controller gets a signal from the molding machine that indicates a "cycle-start", the moment when each new cycle commences. This information may be used alone or in combination with other process data for temperature control. Other embodiments may use real time data on any or all of various system variables including temperature, pressure, flow rate, probe valve position, cycle-start, cycle-end, and various fault signals, in the dynamic control of the loop fluid temperature and/or the mold process temperature.

In yet another circulator embodiment, the controller may receive data from a temperature sensor or other type sensor in the mold so that the control of the mold, die or injection barrel steel temperature is maintained and the real time controller continuously adjusts the rate of flow to control this set point independent of cycle time.

In still another circulator embodiment the thermal control fluid is drawn through the mold, die or injection barrel against the resistance of an in-line restrictor on the supply side of the mold, creating a lower-than-ambient pressure that inhibits fluid leakage from the mold channels.

In an additional circulator embodiment there may be a cycle timing signal consisting of at least one fixed time marker per cycle, such as cycle-start or other identifiable time-based event in the process cycle, supplied from the molding machine and used to run a control loop affecting mold or process temperature by triggering or synchronizing the delivery of repetitive cycles of fluid media in the control loop at a pre-programmed flow rate versus time. For example, over the time period of one molding cycle and one dwell period, the flow rate may ramp up with cycle start, peak in advance of maximum process thermal activity so as to generate a suitably timed temperature differential and thermal transfer rate to control peak temperature, returning to a minimum level for post cycle/dwell period thermal maintenance of the mold.

Further thereto, and in other embodiments, while a cycle-start or other related cycle timing signal triggers or synchronizes cyclic emissions of fluid flow in a control loop according to a pre-programmed fluid flow/time profile or pattern resembling the temperature control requirements of the molding process and the mold configuration, the pre-programmed flow rate may be adjusted in real time or near real time, or periodically as a second order variable, based on sensed temperature at a strategic place in the mold or other useful feedback of system or process data, in order to achieve and maintain the desired mold temperature. If the initial flow rate profile was selected properly, adjustments could be expected to be minor, and stable temperature profiles realized. This technique may help cancel or correct for the gradual effects of changing environmental factors or other external or internal thermal variations or heat build up occurring over the course of extended molding operations. The flow rate pattern for the above embodiment and other embodiments may be in the form of a constant rate mode, pulsed mode, variable rate mode, or any combination of these modes.

In one embodiment, the control loop flow rate may exceed the flow capacity of a fluid supply source when a pump in a circulator according to the invention boosts loop pressure above the pressure of the fluid supply. In another embodiment a pump in a circulator according to the invention may by programmed to create flow rate profiles that boost loop pressure for short durations in order to match cooling curves to plastic injection heating curves. In yet another embodiment, flow rate profiles may be used that vary between full stop or no flow, and a maximum system fluid flow, during the injection cycle or spanning multiple cycles.

In all the above embodiments the invention can create variable flow rates that can be a linear ramp or follow a changing flow rate curve during the injection cycle or spanning multiple cycles. Likewise, flow rates may be continuous or intermittent (pulsed on/off) by a circulator of the invention during the injection cycle or spanning multiple cycles.

According to one embodiment, fluid flow cycles can be can be phased to initiate at any time before, during or after the start of a new injection molding cycle. Further, in this and other embodiments, the fluid flow may be precisely accelerated and decelerated to minimize damaging water hammer effects in the fluid circulation loop.

Another circulator embodiment may be configured to monitor one or more of pressure, temperature, flow or other control loop, system or process variables, and be calibrated for normal operating conditions in any given mold cooling/heating layout so as to detect a changed variable indicating a catastrophic open or closed line or other system or process failure; allowing affected systems to be safely shut down.

The exemplary embodiments and variations described and illustrated above, while not exhaustive of the scope of the invention, can be described alternatively. For example, while the disclosed embodiments are directed to mold, die or barrel temperature control, the invention may be directed to numerous other contained processes where temperature control via a separate or fluidly isolated but thermally associated fluid flow circuit such as in food processing systems, precision machining centers, chemical and mechanical processes and reduction or fabrication processes where thermal energy management is required. One embodiment may be described as a fluid circulator system for regulating the temperature of a mold, die or barrel of a molding machine, where a fluid control loop has a fluid supply line and a fluid return line plumbed to a respective fluid supply manifold and fluid return manifold on said injection molding machine. A fixed displacement pump is disposed in the control loop by which a temperature control fluid is volumetrically advanced from the fluid return line into the fluid supply line. There is a servo motor by which the fixed displacement pump is driven, and a control system by which the servo motor is controlled.

The control system may be a computer-based control system. There may be a fluid temperature sensor connected to the control system and associated with the manner in which the motor is controlled. There may be means for changing the temperature of the temperature control fluid.

The fluid circulator system being a closed loop type circulator. There may be a heat exchanger for changing the temperature of the temperature control fluid; where one side of the heat exchanger is disposed in the control loop, and the other side is connected to a chiller system.

The fluid circulator system may be a direct injection type circulator. There may be a direct injection valve disposed in the control loop and connected to a source of thermally conditioned make-up fluid for changing the temperature of the temperature control fluid. There may be an in-line heater disposed in the control loop in some embodiments. The servo motor may be an electronic servo motor in some embodiments.

Another embodiment of the invention may be described as a fluid medium temperature control system for use in molding operations, consisting of a fixed displacement pump disposed in a fluid circulation loop whereby a temperature control fluid is volumetrically advanced in the circulation loop. The circulation loop is configured with respect to a molding machine, which configuration may be direct plumbing connections to the molding machine or being indirectly connected as through a direct injection type or closed loop type circulator system or other intermediate cooling system connected to the molding machine, for transferring thermal energy between the temperature control fluid and the molding machine such that the temperature of the temperature control fluid is changed from a first temperature to a second temperature which may be higher or lower.

There is a servo motor by which the fixed displacement pump is driven. There is a means for restoring the temperature of the temperature control fluid from the second temperature to the first temperature. There is also a control system by which the servo motor is controlled, in order to control the volume of temperature control fluid being inserted into the temperature control process.

There may be an evaporative cooling unit for restoring the temperature of the fluid from the second temperature to the first temperature. There may be a chiller for restoring the temperature of the fluid from the second temperature to the first temperature. The control system may be a computer-based control system. There may be one or more fluid temperature sensors connected to the control system.

As a further example, there is a temperature control fluid circulator system for a mold, die or barrel of a molding machine, that includes a fluid control loop with a fluid supply line plumbed to a respective temperature control fluid supply manifold on the molding machine, which is in fluid communication with at least one cooling (or heating) cavity proximate the mold, die or barrel, and hence with a fluid return manifold on the molding machine, and the fluid return manifold is plumbed to a respective fluid return line. There is a fixed displacement pump disposed in the control loop whereby temperature control fluid is volumetrically advanced from the fluid return line into the fluid supply line. There is a servo motor that drives the fixed displacement pump, and a control system controlling the servo motor.

There may be an inline restriction to fluid flow incorporated by any or a combination of cooling cavity, manifold and line design, and fixed or variable inline flow restrictors in the fluid control loop, whereby the pressure of the temperature control fluid in the cooling cavity during fluid flow is lowered to at or below its vaporization pressure. There may be a gas or air injector connected to a gas or air source, which may simply be to ambient air pressure if the fluid pressure is lower than ambient, and coupled to the fluid control loop whereby seed bubbles of gas or air may be introduced into the fluid flow in the cooling cavity. The injector may be pre-set, or controlled or modulated by valves and/or a regulator on the gas or air source for achieving the desired rate of gas insertion and bubble activity. The nozzle configuration of the injector may be fixed or variable as well, for best dispersion pattern and bubble formation. There may be a gas extractor in the circulation loop proximate the fixed displacement pump.

There may be included in the control loop a means for restoring the temperature of the temperature control fluid exiting the cooling cavity to the temperature of the temperature control fluid entering the cooling cavity; such as but not limited to a heat exchanger, one side of which is disposed in the control loop, the other side of which is connected to a chiller system.

The circulator may be a direct injection type circulator with a direct injection valve disposed in the control loop and connected to a source of thermally conditioned make-up fluid. There may also or alternatively be an in-line heater disposed in the control loop.

As another example, there may be a circulation loop containing temperature control fluid, where the loop has a fluid supply line connecting the discharge side of a fixed displacement pump to the inlet side of a cooling (or heating) cavity and a fluid return line connecting the outlet side of the cooling cavity with the inlet side of the fixed displacement pump. The cooling cavity is configured for thermal energy transfer between the molding operations and a temperature control fluid therein such that the temperature of the temperature control fluid is changed from a first temperature to a second temperature while passing through the cavity. There is also a means for restoring the temperature of the temperature control fluid from the second temperature to the first temperature, and there is a control system by which the servo motor is controlled.

Still another example of the invention is a method for controlling the temperature of a mold, die or barrel of a molding machine, consisting of: advancing a controlled volume of a temperature control fluid at a first temperature in a temperature control loop into the cooling cavity of a mold, barrel or die by means of a fixed displacement pump driven by a servo motor, where the cooling cavity is configured with respect to the mold, barrel or die with means for transferring thermal energy between the temperature control fluid in the cavity and the mold, barrel or die, thereby changing the first temperature of the fluid to a second temperature. Then further advancing the controlled volume of fluid out of the cooling cavity and restoring its thermal energy level to substantially the first temperature. The method may include calculating the rate of advancing of the controlled volume based on differences in the temperatures, or at a rate calculated to maintain a constant thermal energy level in the mold, die or barrel of the molding machine.

There may also be a displaying in real time on an operator interface of the rate of the advancing of the temperature control fluid. There may be a displaying in real time on an operator interface of the first and/or the second temperature. There may be a displaying in real time on an operator interface of the rate of delivery of thermal energy from the molding machine to the control loop or vice versa.

The foregoing description of the embodiments of the invention has been presented for the purposes of illustration and description. It is not intended to be exhaustive or to limit the invention to the precise form disclosed. Many modifications and variations are possible in light of this disclosure.

What is claimed is:

1. A temperature control liquid circulator system configured for circulating a temperature control liquid through a process that includes a mold, die or barrel, the temperature control liquid circulator system comprising:
   a liquid control loop comprising a liquid supply line plumbed to an inlet side of a cooling cavity associated with said mold, die or barrel and a liquid return line plumbed to an outlet side of said cooling cavity;
   a pump disposed in said liquid control loop whereby the temperature control liquid is advanced from said liquid return line into said liquid supply line and through said cooling cavity;
   an inline restriction to liquid flow in said liquid control loop, the restriction being configured to lower a pressure of said temperature control liquid in said cooling cavity below ambient pressure and below the vapor pressure of the temperature control liquid in the cooling cavity; and
   a gas injector connected to a gas source and coupled to said liquid control loop, said gas injector being configured for introducing seed bubbles of gas into said liquid flow at a location in said liquid flow that will cause the seed bubbles to initiate boiling of the temperature control liquid at a desired location in the cooling cavity even if the temperature control liquid is depleted of dissolved air and would otherwise be subject to delayed boiling.

2. The liquid circulator system of claim 1, wherein the pump is a positive displacement pump that meters the temperature control liquid in exact quantities in proportion to a speed at which the positive displacement pump is driven, the positive displacement pump being driven by a motor having a programmable and controllable speed which is independent of variations in line voltage.

3. The liquid circulator system of claim 1, further comprising at least one liquid temperature sensor connected to said control system.

4. The liquid circulator system of claim 1, further comprising means for restoring the temperature of said temperature control liquid exiting said cooling cavity to the temperature of said temperature control liquid entering said cooling cavity.

5. The fluid circulator system of claim 4, said liquid circulator system being a closed loop type circulator, said means for changing the temperature of said temperature control liquid comprising a heat exchanger, one side of which is disposed in said control loop, the other side of which is connected to a chiller system.

6. The fluid circulator system of claim 4, said liquid circulator system being a direct injection type circulator, said means for changing the temperature of said temperature control liquid comprising a direct injection valve disposed in said control loop and connected to a source of thermally conditioned make-up liquid.

7. The liquid circulator system of claim 4, said means for changing the temperature of said temperature control liquid comprising an in-line heater disposed in said control loop.

8. The liquid circulator system of claim 1, further comprising a gas extractor in the circulation loop.

9. A method of controlling the temperature of a mold, die, or barrel of a process, the method comprising:
  advancing a temperature control liquid at a first temperature in a temperature control loop into a cooling cavity of the mold, die, or barrel by means of a pump, said cooling cavity being configured with respect to said mold, die, or barrel with means for transferring thermal energy between said temperature control liquid and said mold, die, or barrel while said liquid is present therein, thereby changing said first temperature of said temperature control liquid to a second temperature;
  reducing a pressure of said temperature control liquid in the cooling cavity below ambient pressure and below the vapor pressure of the temperature control liquid in the cooling cavity; and
  removing heat from the temperature control liquid in the cooling cavity by injecting seed bubbles into said temperature control liquid that induce boiling of the temperature control liquid at a desired location within the cooling cavity even if the temperature control liquid is depleted of dissolved air and would otherwise be subject to delayed boiling.

10. The method of controlling the temperature according to claim 9, further comprising:
  further advancing said temperature control liquid at said second temperature out of the cooling cavity; and
  restoring said temperature control liquid to substantially said first temperature.

11. The method of controlling the temperature according to claim 10, further comprising:
  calculating a rate of advancing of said temperature control liquid based on differences in said first temperature and said second temperature.

12. The method of controlling the temperature according to claim 9, further comprising:
  advancing said temperature control liquid with a delivery profile calculated to maintain a desired thermal profile for said mold, die or barrel.

13. The method of controlling the temperature according to claim 9, said pump being a positive displacement pump that meters the temperature control liquid in exact quantities in proportion to a speed at which the positive displacement pump is driven, said positive displacement pump being driven by a motor having a programmable and controllable speed which is independent of variations in line voltage.

14. The method of controlling the temperature according to claim 9, further comprising:
  removing from said temperature control liquid gas from said seed bubbles injected into said temperature control liquid in said control loop.

15. The liquid circulator system of claim 1, wherein the pump is disposed proximate to the outlet side of the cooling cavity and the inline restriction to fluid flow is disposed proximate to the inlet side of the cooling cavity, so that the thermal control liquid is drawn through the cooling cavity at a lower-than-ambient pressure that inhibits fluid leakage from the cooling cavity.

16. The liquid circulator system of claim 1, wherein the inline restriction is variable under control of a digital control system.

17. The liquid circulator system of claim 1, wherein the gas injector is variable.

18. The method of controlling the temperature of claim 9, wherein the pump is disposed proximate to an outlet side of the cooling cavity and an inline restriction to fluid flow is disposed proximate to an inlet side of the cooling cavity, so that the thermal control liquid is drawn through the cooling cavity at a lower-than-ambient pressure that inhibits fluid leakage from the cooling cavity.

19. The method of controlling the temperature of claim 9, wherein reducing the temperature of the temperature control liquid includes advancing the temperature control liquid through an inline restriction that is variable under control of a digital control system.

20. The method of controlling the temperature of claim 9, wherein the seed bubbles are injected into the temperature control liquid by a gas injector that is variable.

* * * * *